March 26, 1963

J. FROST 3,082,916

MEASURING DISPENSER

Filed March 3, 1960

INVENTOR
J. FROST
BY
Lieber, Lieber & Nilles
ATTORNEY

INVENTOR
J. FROST
BY
Lieber, Lieber & Nilles
ATTORNEY

March 26, 1963 J. FROST 3,082,916
MEASURING DISPENSER
Filed March 3, 1960 6 Sheets-Sheet 5

INVENTOR
J. FROST
BY
Lieber, Lieber & Nilles
ATTORNEY

March 26, 1963

J. FROST 3,082,916

MEASURING DISPENSER

Filed March 3, 1960

INVENTOR
J. FROST
BY
Lieber, Lieber & Nilles
ATTORNEY 3,082,916
MEASURING DISPENSER
James Frost, Stockport, England, assignor to Pickering & West Limited, Glossop, Derbyshire, England, a British company
Filed Mar. 3, 1960, Ser. No. 12,650
3 Claims. (Cl. 222—168.5)

The invention concerns improvements in or relating to measuring devices, dispensers or the like, and more particularly to such devices for use in the canning, bottling, packaging or like industries.

It is usual in the canning or bottling industries for containers to be fille dautomatically with whatever commodity is being processed and for any excess commodity to be removed by a subsequent horizontal sweeping motion of a suitably shaped member moving immediately above the upper edge of the container being filled.

Such a procedure is adequate when commodities are being processed which are of small dimensions. A horizontal sweeping motion will remove bodily from a container such an item as a pea or similarly dimensioned object if that item is protruding above the top of the container.

However, when we consider commodities with larger dimensions and of a more easily damaged nature, for example strawberries or peaches, such a procedure as has been described will result not in the bodily removal of the item protruding above the lip of the container, but in the mutilation of the item. This damage is liable to result in a subsequent deterioration in the condition of the contents of a can or bottle and it is usual to fill containers by hand when such commodities are processed.

It is an object of the present invention to enable the filling of containers with large or small, liquid, solid or semi-solid items to be done automatically, and more particularly to provide a means whereby the larger and more easily damaged fruits may be processed.

According to the present invention a measuring device or dispenser adapted to form part of an automatic machine for dispensing measuring amounts of a commodity to a plurality of containers moving successively to a filling station, includes a measuring chamber, means containing a supply of the commodity, said chamber being adapted to be moved repeatedly, relative to said supply, from a first position to a second position in which it becomes filled automatically from said supply, and then back to said first position, when means for releasing the contents of the chamber become operative, all in synchronism with the movement of said containers.

The chamber may be the inside of a hollow cylindrical member open at its top end and having an openable closure at its bottom end, the cylinder moving from a position in which its top end is above the surface of the supply of commodity to a position in which its top end is below said surface, whereby, in the latter position the commodity automatically fills the chamber by gravity, and, in the second position the bottom closure may be opened to dispense the commodity from the chamber to a container. If necessary, means may be provided for levelling the commodity at the upper end of the chamber after filling, in the case of a delicate commodity such as soft fruits a jet of air of a pressure and volume consistent with the material being processed may be used.

Preferably according to the present invention the measuring device is so adapted as to permit of the adjustment of the capacity thereof.

In an alternative embodiment the chamber may be filled through passages in the walls of the cylinder which would be closed at its top end, the passages in one position of the cylinder being out of alignment with a pipe through which the commodity is urged to flow, and in the other position being aligned therewith to enable the chamber to fill.

The invention will now be described further, by way of example, with reference to and as illustrated in the accompanying drawings, in which.

Figure 1:
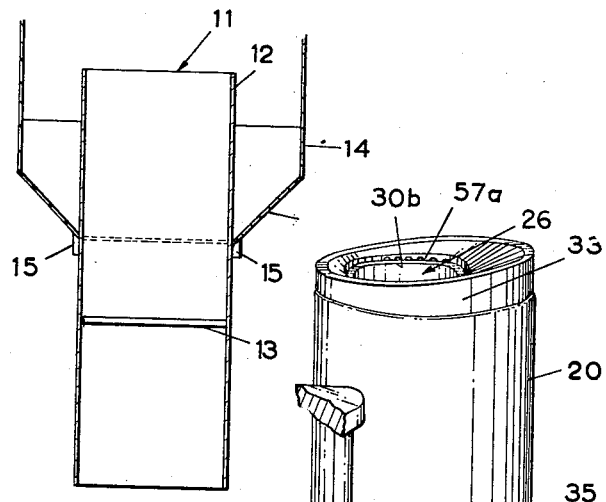
FIG. 1 is a diagrammatical representation of an embodiment of the present invention.

Referring now to FIG. 1 an open cylindrical chamber 11 formed by a cylindrical side wall 12 and a closure 13 is capable, by virtue of means not shown, of executing a vertical reciprocating motion through the base 14a of a hopper 14 containing a liquid, semisolid or solid substance. Suitable sealing means 15 are provided between the chamber walls 12 and the hopper 14 to prevent leakage from the latter. The closure 13 of the chamber 11 is hinged and constitutes a control means through which the contents of chamber may be discharged.

In operation the hopper 14 is filled to a predetermined level with a liquid, semi-solid or solid substance being processed. If we consider the cycle of operation to begin with the chamber empty and at the upper limit of its movement, the sequence is as follows:

The closure 13 is closed and the chamber 11 is moved downwards. The contents of the hopper 14 move into and fill the chamber 11 under the action of gravity. A reversal of the direction of motion then takes place and the chamber 11 is raised until the upper end 11a thereof is above the new surface level in the hopper.

The closure 13 at the base of the chamber is opened and the measured quantity is discharged into a suitably placed container.

Figure 2:
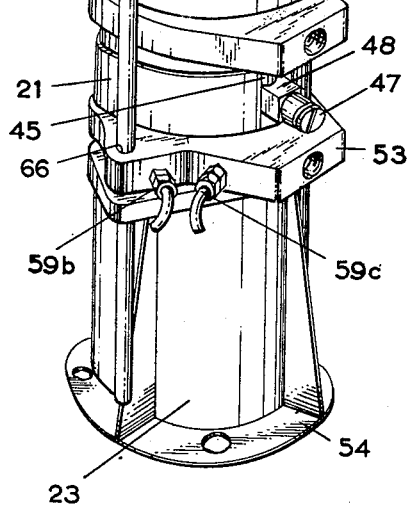
FIG. 2 is a perspective view of a measuring device embodying the principle of the FIGURE 1 device.
Figure 3:
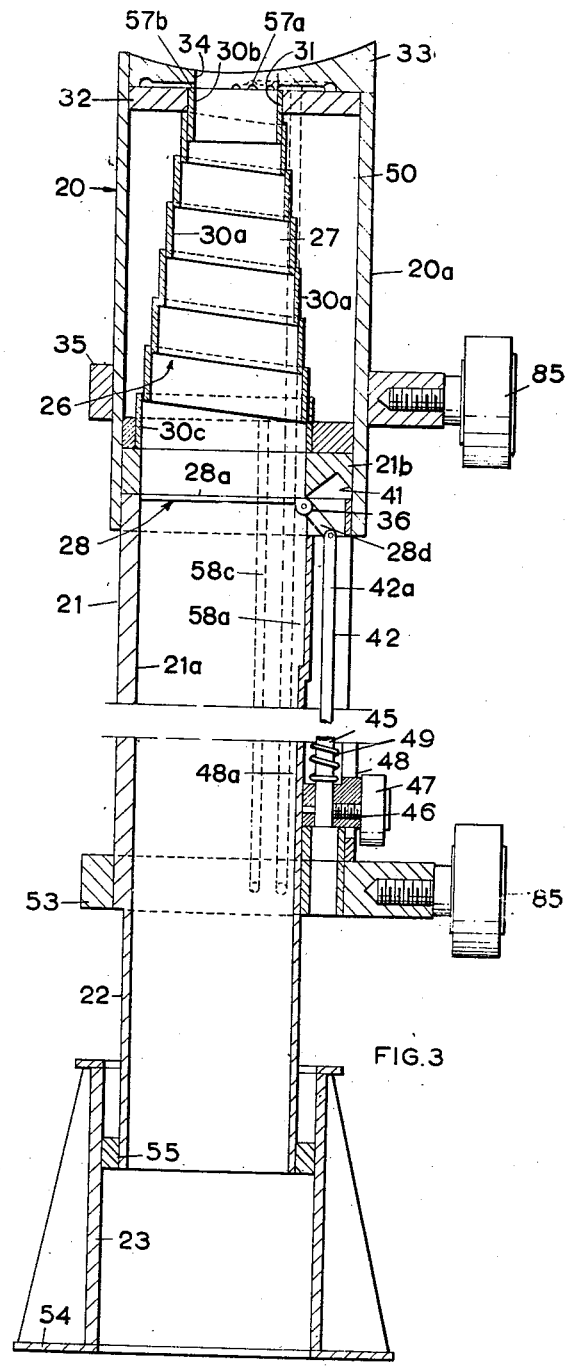
FIG. 3 is a vertical sectional view taken through the central vertical axis of the FIG. 2 device.
Figure 4:
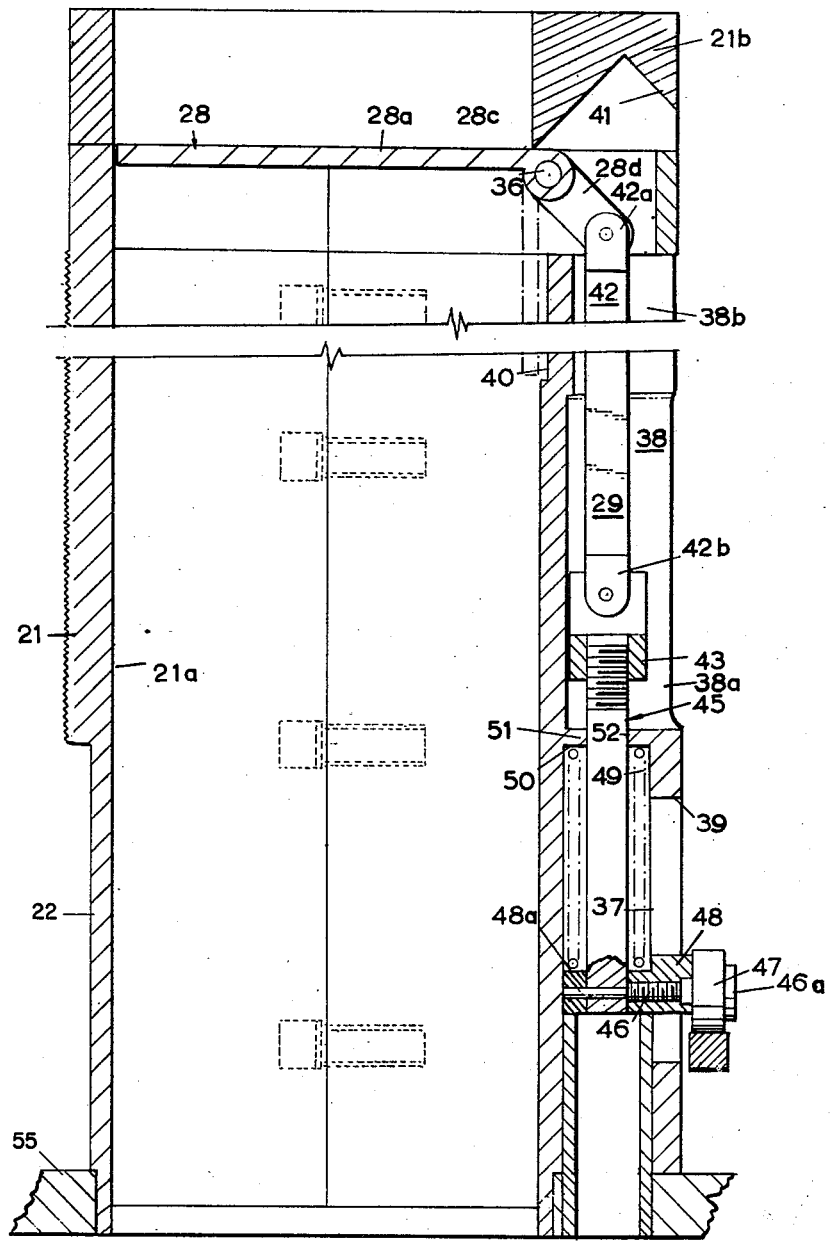
FIG. 4 shows an enlarged view of part of FIG. 3.

Referring now to FIG. 2 which shows, in perspective, a measuring device in accordance with the present invention, and to FIG. 3 which shows a cross section longitudinally thereof, and FIG. 4 said device consists essentially of four vertically orientated coaxial hollows cylinders 20, 21, 22, 23, extending from, at the upper end, a supply hopper 24 to, at the lower end, a packaging station 25.

The two cylinders 20, 21 together constitute the measuring chamber 26 and are so adapted as to allow of the adjustment of the capacity thereof.

The bottom cylinder 23 is fixed in position, as is the hopper 24 relative thereto, and the intermediate cylinders 20, 21 22 are adapted to execute a reciprocating motion in sliding engagement therebetween.

The measuring chamber 26 comprises an upper and a lower cylindrical element 20, 21 respectively as has been stated, the upper element 20 carrying means 27 whereby the capacity of the chamber 26 may be varied, the lower element 21 the closure 28 and actuating means 29 therefor. The upper element 20 consists of a sleeve like member 20a having located therein a spiral 30, said spiral 30 being of metal and having seven coils 30a each one inch wide. The diameter of the upper end of the spiral 30, when fully extended is approximately three and one sixteenth inches, the diameter of the bottom and three and three quarter inches. The upper end 30b of the spiral 30 is secured to the periphery of a through hole 31 in a top plate 32, said plate 32 being secured to the sleeve like member 20a in the plane of the open end thereof, said hole 31 being disposed eccentrically of the plate 32.

A cover 33 is secured to the outside of the plate 32, said cover 33 having an eccentric hole 34 therethrough corresponding to the hole 31 through the top plate 32, the upper surface of the cover 33 being bevelled towards the eccentric hole.

An annular flange 35 is provided outwards of the sleeve-like member 20a and at the lower end thereof.

The lower element 21 comprises a hollow cylindrical member having an eccentric bore 21a the position of said bore 21a being such that the latter will be in register with the holes in the cover and top plate when the device is assembled. At the upper end of the element 21 is located closure means 28 in the form a substantially D-shaped flap 28a said flap 28a being pivotally mounted upon an axis 36 adjacent the bore 21a the latter being modified to receive the flap 26a when in the open position.

Within the thicker wall portion 21b of the element 21 is located actuating means 29 whereby the flap 28a may be controlled.

Two elongated slots 37, 38 are cut in the thicker wall portion 21b the slots 37, 38 together extending over substantially the whole length of the cylinder. The lower slot 37 extends from the bottom of the cylindrical member to a point some three and one quarter inches therefrom. An elongated port 39 is cut in the wall 21b such port 39 being one and three quarter inches long and providing access to the lower slot 37. The upper slot 38, spaced from the lower slot 37 by approximately three eighths of an inch, is in two parts, the lower portion 38a being some five eighths of an inch wide and two and three eighths inches long, the upper portion 38b approximately three eights of an inch wide and extending to the top of the cylindrical element 21.

At the upper end of the bore 21a the otherwise cylindrical cross section is modified to provide a seating 40 for the flap 28a when in the open position. The modified cross-section is rectangular, such cross section extending only over one side of the bore 21a such side corresponding to the thickened wall portion 21b the longitudinal extent of the modification being determined by the dimensions of the flap 28a.

The flap 28a comprises a body part 28b from which extend extensions 28c whereby the flap may be mounted for pivotal motion about an axis and an additional extension whereby the actuating means 29 for the closure 28 may be connected. The additional extension 28d is cranked in relation to the body part 28b.

That portion of the lower element 21 immediately above the closure 28a has connected thereto the lowermost coil 30c of the spiral 30.

The wall 21b of the element 21 is modified by the provision of a cut out 41 to receive the cranked extension 28d upon the opening of the flap.

The actuating means 29 whereby the closure 28 may be controlled comprises a link-rod 42 secured at its upper end 42a to the cranked extension 28d to the closure 28 and at its lower end 42b to a U-shaped element 43.

A pushrod 45 is in screw-threaded engagement at its upper end with the U-shaped element 43 and has transversely of its lower end a pin 46 upon the flanged outer end 46a of which is mounted a cam follower 47.

The pin 46 passes through a push block 48, said block having a rebate 48a on the upper surface thereof to provide a seating for the lower end of a helical compression spring 49. The upper end of the spring 49 is received in a rebated formation 50 in the underside of the flange 51 between the upper slots 37 and lower slots 38 in the cylindrical member 21.

A through hole 52 is cut in the flange 51 thus to allow passage therethrough of the upper end of the push rod 45.

The push rod 45 is largely accommodated in the lower slot 37, the link rod 42 in the upper slot 38, the pin 46 extending through the elongated part 39 in the lower slot.

The lower element 21 has an outwardly directed annular flange 53 at the lower end thereof.

A third sleeve-like element 22 is secured to the bottom of the lower element 21 of the measuring chamber 20, the axis of such third element 22 coinciding with the axis of the bore of the measuring chamber.

The lower end of the third sleeve-like element 22, for convenience hereinafter called a connection member 22, is in telescopic engagement with a base member 23, said base member 23 being cylindrical in form and being rigidly secured to a base plate 54.

Between the connection member 22 and the base member 23 is provided a sealing bush 55.

The measuring chamber 26 is provided with vortex producing means 56 whereby any commodity above the top of the measuring chamber may be displaced for subsequent removal by a wiper (not shown). Said means 56 comprise two sets 57a, 57b of outlet holes in the cover 33 of the measuring chamber, each set of holes being so disposed as to direct a jet of air across the plane of the top of the chamber, one set being displaced relative to the other, each being symmetrically placed relative to the axis of the bore. An individual feed line respectively is supplied for each set of holes, only one such line 58a being shown, said lines being disposed within the outer shell of the upper cylinder 20 and being connected to air lines at the flange 53 to the cylinder 21. An air line 59b is illustrated and is connected to the second line at 58a. A third feed line 58c carries air into that space 50 between the inner wall of the upper cylinder 20 and the spiral 30 the air moving between the coils 30a of the spiral 30 thus to prevent accumulation thereat of parts of the commodity being processed.

For convenience the feed lines 58a, 58b are also connected to water lines, not shown, thus to facilitate the cleaning of the chamber.

Similarly the third feed line 58c is connected to a water line so that either air or water, as required, may be passed therethrough.

Figure 5:
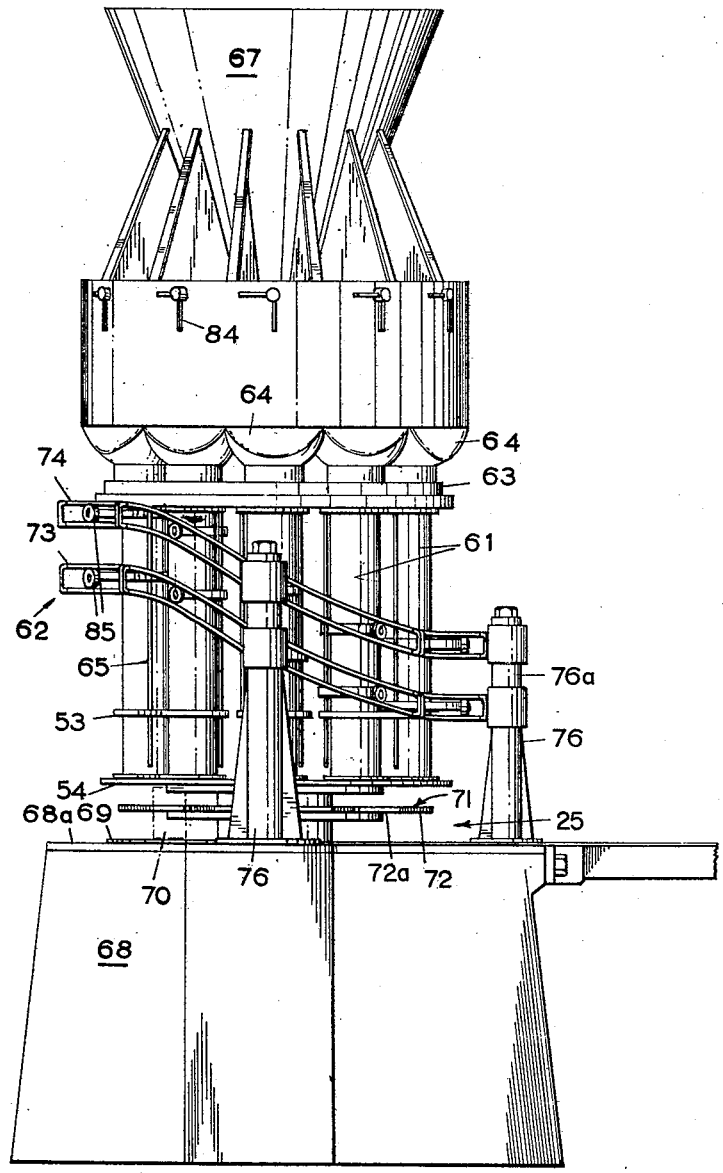
FIG. 5 shows, in side elevation, an automatic machine incorporating a plurality of measuring devices.
Figure 6:
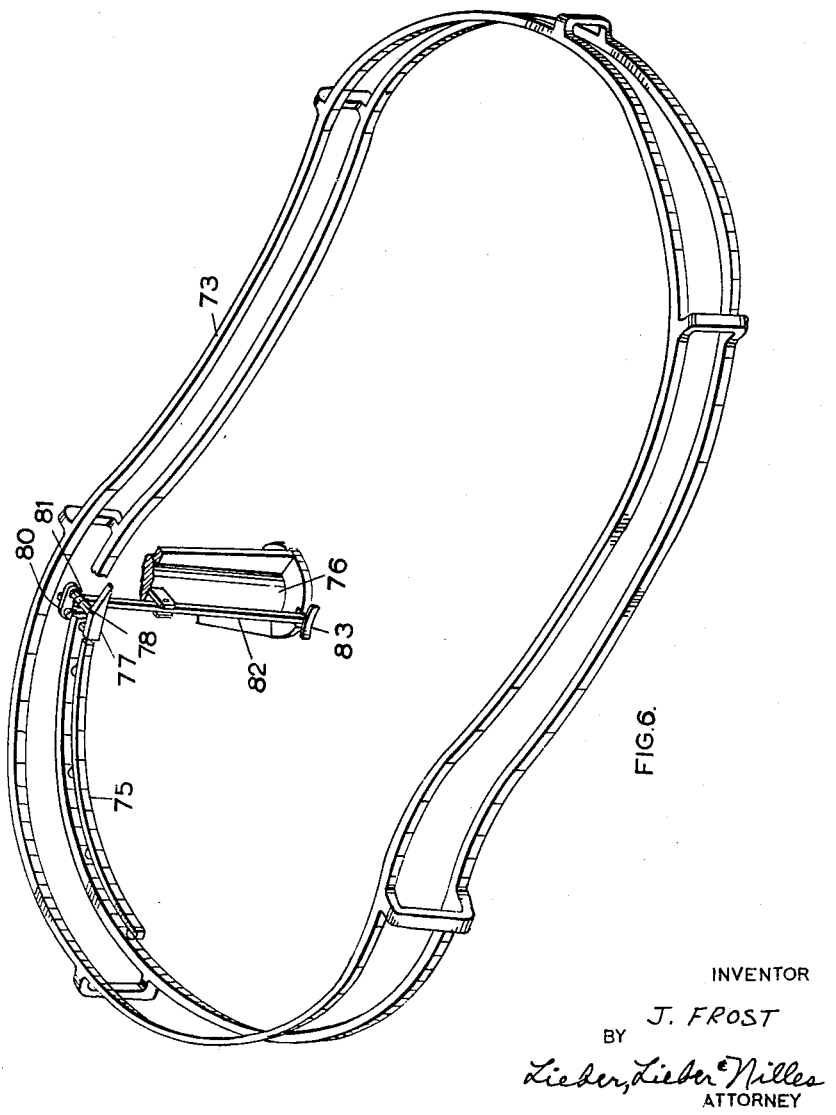
FIG. 6 shows, in perspective, part of the machine illustrated in FIG. 5.
Figure 7:
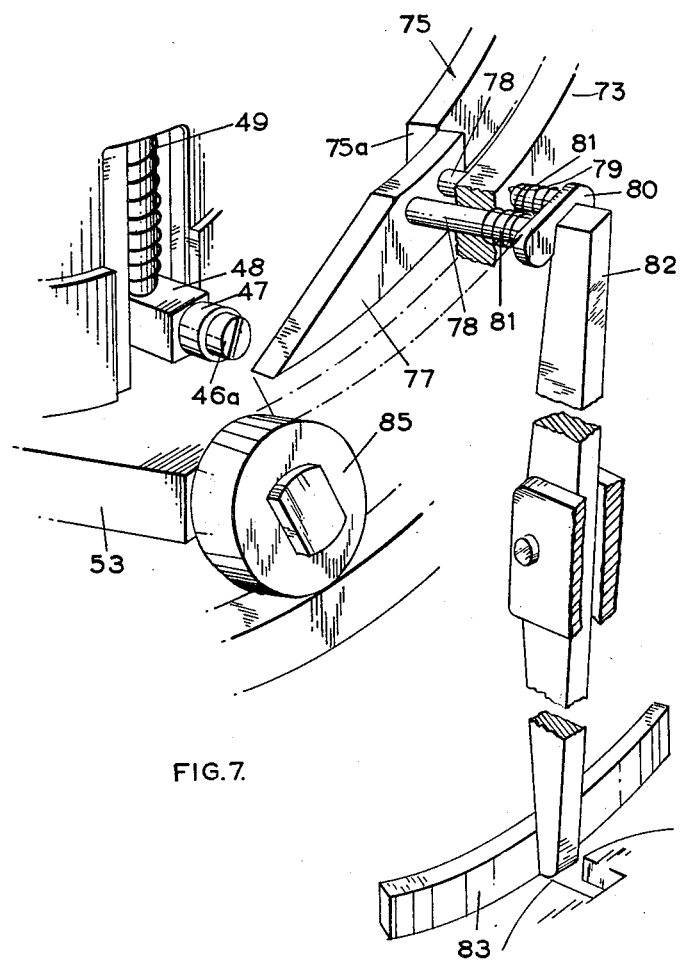
FIG. 7 shows, to a larger scale he mechanism whereby the bottom closure of the dispenser may be opened.

The operation of the device has been described in general terms with reference to FIG. 1, and for convenience a more detailed description will be delayed until the arrangement of FIGS. 5, 6 and 7 have been described.

Referring now to FIGS. 5, 6 and 7 an automatic machine for the dispensing of measured quantities of a commodity comprises a plurality of measuring devices 61 disposed about a central axis, means (not shown) whereby said units may be rotated about said axis, means 62 whereby said units may, individually, be caused to execute a reciprocating motion relative to a supply source during such rotational motion and means whereby the closure means 28 of each device 61 may be caused to open at an appropriate part of the cycle.

The individual measuring devices 61 are supported upon a circular base plate 54 coaxial with said central axis, the base member 23 of each device 61 being secured to said plate 54, there being a through hole in the plate corresponding to the inner diameter of each base member 23.

A top ring 63 is provided around the machine and is disposed slightly below the individual supply hoppers 64.

To said top ring 63 are secured guide rods for the reciprocating motion of the individual devices 61, said rods 65 being in engagement with a through hole 66 in the annular flange 53 of the lower element 21 of the measuring chamber.

Said individual supply hoppers 64 are fed from a master hopper 67 into which the commodity is first introduced, there being an agitator (not shown) provided whereby the commodity may be transferred to the individual supply hoppers 64.

A support casing 68 for the machine carries a track 69 along which cans 70 to be filled may be progressed, the spacing of the base plate 54 from the top 68a of such casing 68 being in excess of the vertical dimension of the can 70.

Between the top 68a of the casing and the underside of the base plate 54 is disposed a can progressing element 71, said element 71 being substantially circular and having a plurality of radial fingers 72 directed outwardly thereof. The can progressing element 71 is mounted for rotational motion about the central axis with the measuring units and the space 72a between adjacent radial fingers 72 corresponds to the outlet of one or other of the measuring units.

Some three cam tracks 73, 74, 75 are disposed about the measuring devices.

The first two of these tracks 73, 74 are parallel and are spaced apart by a distance dependent upon the required capacity of the measuring compartments. The lower track 73 is supported by pillars 76, each pillar 76 has a central core 76a in telescopic engagement therewith, said core 76, which supports the upper can tracks 74, being adjustable in position longitudinally of the pillar 76 thus to effect adjustment of the capacity of the measuring compartment by means of a screw jack.

Referring now particularly to FIG. 7 the third cam track 75 controls the actuating means 29 for the closure means 28 of each measuring unit 61. The nose 77 of the cam track 75 is adapted to be displaced from a normal inoperative position into position at the end 75a of the track 75 only when a can is in position on the track 69 on the support casing thus the discharging of the contents of the dispenser when no can is in position to receive such contents is obviated.

The nose 77 of the cam track 75 is supported by two pegs 78, said pegs 78 passing through holes 79 in the lower cam track 73. Between the outer surface of the cam track 73 and a plate 80 secured to the ends of the pegs 78 are provided compression springs 81 whereby the nose 77 of the cam track 75 may be maintained in a normal, inoperative position.

The nose 77 will be displaced to assume an operative position by means of a pivoted lever 72 suitably supported by one of the cam track support pillars 75, said pivoted lever 82 being pivoted by means of a pusher arm 83 which is so moved as to pivot the lever 82 upon contact by a can.

At the top of each measuring unit is provided means whereby excess commodity displaced by the jets of air may be removed. Such means are not illustrated but comprise a brush which executes an oscillatory motion across the top of the measuring compartment. The L-shaped elements 84 on the master hopper 67 are secured to the axis about which the individual brushes operate and are utilised, in conjunction with opearting means not shown, to oscillate the brushes.

In operation the plurality of measuring devices 61 and individual supply hoppers 64 are continuously rotated about the central axis and during such motion the individual measuring devices 61 execute, in succession, a reciprocatory motion. The reciprocatory motion is derived from the motion of cam followers 85 secured to the flanges 35, 53 on the bottom of each part 20, 21 respectively of the measuring chamber in contact with the appropriate cam track.

At an appropriate time in the cycle, the nose 77 of the flap actuating means control cam track 75 having been displaced to an operative position by means of the pivotal motion of the lever 82, the closure of the measuring chamber will be opened and the contents thereof discharged to an appropriately positioned can. Upon completion of the discharge, the closure means will return to its effective position and the filling cycle will recommence.

In the event of there being no can in position beneath a measuring unit, the nose of the appropriate cam track will be in an inoperative position, the cam follower 47 associated with the closure actuating means 29 will move along the underside of the cam track 75 and thus the closure means 28 will not open. This "fail-safe" arrangement takes account of the failure of the supply of cans to the machine.

An automatic machine as has been described will allow of the high speed filling of cans and will require little in the way of supervision.

Empty cans will be taken by the fingers 72 of the can progressing element 71, and will be accurately located beneath the outlet of the appropriate measuring chamber by means of a worm screw (not shown) will be filled and, after filling, discharged to a can sealing machine.

The machine is of wide application since the capacity of the measuring chamber can be readily altered by an adjustment in the separation of the parallel can tracks.

Furthermore, the provision of a jet of air or water, as required between adjacent coils of the spiral will assist in the cleaning of the machine and the ready changeover from the processing of one to the processing of another commodity.

Such embodiment as has been described may be applied to the automatic measuring of quantities of solids, especially vegetables and fruits of liquids and combinations of solids and liquids and to the supply of these measured quantities to suitable containers.

The invention is not restricted to the features of the embodiments hereinbefore described since alternatives will readily present themselves to one skilled in the art.

For example, the embodiment illustrated in FIGS. 1 and 3 may be constructed as an in-line machine. A plurality of measuring devices may be mounted side-by-side above an equal number of parallel package delivery tracks. Packages may be delivered simultaneously along all the tracks and the contents of all measuring chambers simultaneously discharged.

What I claim is:

1. A measuring device and dispenser adapted to form part of an automatic machine for dispensing measured amounts of a commodity to each of a plurality of containers moving successively to a filling station including a measuring chamber, a supply hopper containing a supply of the commodity, said hopper having a bottom and an opening in said bottom, means mounting said chamber in said opening for repeated reciprocation with respect to said hopper from a first position to a second position in which it becomes filled automatically from said hopper, and then back to said first position when means for releasing the contents of the chamber become operative, all in synchronism with the movement of said containers, the measuring chamber comprising two elements in telescoping engagement one with the other thereby to allow of a variation in capacity of the measuring chamber and a flat spiral formation connected to and disposed between the upper ends of the two elements forming the chamber, said spiral formation being expanded or contracted upon telescopic motion of the elements and forming the upper part of the chamber.

2. A measuring device and dispenser adapted to form part of an automobile machine for dispensing measured amounts of a commodity to each of a plurality of containers moving successively to a filling station including a measuring chamber, a supply hopper containing a supply of the commodity, said hopper having a bottom and an opening in said bottom, means mounting said chamber in said opening for repeated reciprocation with respect to said hopper from a first position to a second position in which it becomes filled automatically from said hopper, and then back to said first position when means for releasing the contents of the chamber become operative, all in synchronism with the movement of the containers, the measuring chamber comprising a pair of vertically disposed tubular elements in telescoping engagement one with the other, a flat spiral formation connected to and disposed between the upper ends of said tubular elements, the lower tubular element having an eccentric bore therein which defines a thicker wall part, an operable closure in such bore, and linkage means disposed within the thicker wall part of the said element and connected to said closure for actuation thereof.

3. An automatic machine for dispensing measured amounts of a commodity successively to a plurality of containers, said machine including at least one measuring device comprising; a supply hopper for containing a supply of the commodity, a vertically positioned hollow cylinder open at its top end and having an operable closure at its bottom end, said cylinder extendable into said hopper, a measuring chamber located inside said cylinder and formed by two telescoping elements having a flat spiral formation connected to and disposed between the upper ends of said elements, said spiral formation being expanded or contracted upon telescopic motion of said elements, means for mounting said cylinder for repeated reciprocation relative to said supply hopper and between a first position in which said open top end is below said surface whereby the commodity automatically fills the chamber by gravity, and a second position in which the open top end is above the surface of the commodity, means for opening said closure when said cylinder is in said second position; and means for rotating each device bodily about an axis remote therefrom.

References Cited in the file of this patent

UNITED STATES PATENTS

| | | |
|---|---|---|
| 559,386 | Jones | May 5, 1896 |
| 839,035 | Ricketts | Dec. 18, 1906 |
| 1,052,377 | Pindstofte | Feb. 4, 1913 |
| 1,166,607 | La Porte | Jan. 4, 1916 |
| 1,458,903 | Holmquist | June 12, 1923 |
| 1,488,122 | Jurgens | Mar. 25, 1924 |
| 1,731,464 | Kantor | Oct. 15, 1929 |
| 2,086,890 | Ashlock et al. | July 13, 1937 |
| 2,144,569 | Frazier | Jan. 17, 1939 |
| 2,172,012 | Luhdorff | Sept. 5, 1939 |
| 2,351,764 | Jarrett | June 20, 1944 |
| 2,527,960 | Rapp | Oct. 21, 1950 |
| 2,684,804 | Huntar et al. | July 27, 1954 |
| 2,740,560 | Bridge | Apr. 3, 1956 |
| 2,815,046 | McBean et al. | Dec. 3, 1957 |

FOREIGN PATENTS

| | | |
|---|---|---|
| 12,609 | Great Britain | May 30, 1913 |
| 721,859 | France | Dec. 23, 1931 |

OTHER REFERENCES

German application 1,042,454, printed Oct. 30, 1958 (KL. 81a 5).